US011481393B2

(12) United States Patent
Falsafi et al.

(10) Patent No.: US 11,481,393 B2
(45) Date of Patent: Oct. 25, 2022

(54) QUERY-BASED ISOLATOR

(71) Applicant: Kinaxis Inc., Ottawa (CA)

(72) Inventors: Pedram Falsafi, Ottawa (CA); Sriprasadh Raghunathan, Ottawa (CA); Prabhakar Regmi, Ottawa (CA)

(73) Assignee: Kinaxis Inc., Ottawa (CA)

( * ) Notice: Subject to any disclaimer, the term of this patent is extended or adjusted under 35 U.S.C. 154(b) by 94 days.

(21) Appl. No.: 16/595,973

(22) Filed: Oct. 8, 2019

(65) Prior Publication Data

US 2021/0103588 A1    Apr. 8, 2021

(51) Int. Cl.
| | | |
|---|---|---|
| *G06F 16/30* | (2019.01) | |
| *G06F 16/2453* | (2019.01) | |
| *G06F 16/242* | (2019.01) | |
| *G06F 16/2455* | (2019.01) | |
| *G06F 16/22* | (2019.01) | |

(52) U.S. Cl.
CPC ........ *G06F 16/24542* (2019.01); *G06F 16/22* (2019.01); *G06F 16/2425* (2019.01); *G06F 16/2455* (2019.01)

(58) Field of Classification Search
CPC .............. G06F 16/24542; G06F 16/22; G06F 16/2425; G06F 16/2455; G06F 16/24568; G06F 16/2393; G06F 16/2428; G06F 16/245; G06F 16/24556; G06F 16/2246
USPC ........ 707/609, 687, 705, 769, 790, 813, 821
See application file for complete search history.

(56) References Cited

U.S. PATENT DOCUMENTS

| | | | |
|---|---|---|---|
| 6,850,925 B2 | 2/2005 | Chaudhuri et al. | |
| 7,873,664 B2 | 1/2011 | Andersch et al. | |
| 8,694,527 B2 | 4/2014 | Marum et al. | |
| 2012/0265744 A1* | 10/2012 | Berkowitz | G06Q 30/0613 707/705 |
| 2015/0363469 A1* | 12/2015 | Peloski | G06F 16/24556 707/741 |
| 2016/0314166 A1* | 10/2016 | Peloski | G06F 16/245 |
| 2016/0378675 A1* | 12/2016 | Giuliani | G06F 11/3688 711/206 |
| 2017/0206229 A1* | 7/2017 | Caudy | G06F 16/2428 |
| 2017/0262495 A1* | 9/2017 | Peloski | G06F 16/2246 |
| 2019/0095173 A1* | 3/2019 | Kaufman | G06F 7/00 |

* cited by examiner

*Primary Examiner* — Sana A Al-Hashemi
(74) *Attorney, Agent, or Firm* — Borden Ladner Gervais LLP; Curtis B. Behmann (57) ABSTRACT

A query-based isolator comprising an observer, a collator and an extractor. The isolator reduces the database on which the query is run, to a new smaller, database on which the query can be performed, with the same result obtained on the smaller database, as that obtained on the original database.

10 Claims, 12 Drawing Sheets

QUERY-BASED ISOLATOR

BACKGROUND

Databases have grown exponentially, leading to maintenance issues. Often, the contents of the entire database are not used on a regular basis. There may be quite a bit of extra data that is saved in the database, but rarely accessed. Currently, there is no automated approach that extracts a minimal subset of the database to run specific queries. In addition, it is neither automatically, nor easily possible to parallelize elements within the database since the dependencies between queries are not readily available. This results in the unnecessary use of resources (e.g. time, disk space, and memory) to execute queries, leading to inefficiencies and maintenance issues.

There is a need to increase the efficiency of handling a query performed on a database, by performing the query on a database subset that includes only those records that are required for the query.

BRIEF SUMMARY

There is provided a system that increases the efficiency of handling queries, the system comprising: a) an observer that observes the records (in the database) that are being used to perform a query; b) a collator that forms a set of these records, along with linked records that are linked to these query records; and c) an extractor that extracts all the linked records along with their relationships to make a database subset. The resulting database subset can then be used to perform the query. The database subset is stand-alone, and can be stored in the same, or separate devices as the database.

These elements may combine as follows: when a user sends a request/query to the database, the observer tracks the required records to form the results. The collator also walks through the related records to identify dependent/linked records. The database assigns a unique identifier to each stored record (i.e. a record-id); the extractor forms subsets of the database by extracting dependent record-ids.

In this manner, unnecessary data can be identified and removed from database. In addition, one large database can be divided into smaller independent subsets. Queries that use independent subsets can be performed in parallel, rather than sequentially on the entire database. Furthermore, the resulting smaller databases are less recourse intensive (i.e. require less maintenance, disk space, memory, etc.).

Additional technical advantages of the disclosed query-based isolator include reduced connections to the main database and avoidance of making a full copy of the database locally, since the database subset is smaller than the full database. In addition, there is faster query execution time as there are a fewer number of records to process, especially when the query has filters.

In one aspect, there is provided a computing system comprising: a storage device storing a database; a memory storing processor-executable program code; and a processor to execute the processor-executable program code in order to cause the computing system to: receive a query and an expected result of the query obtained after executing the query on the database; in response to the query, track records associated with the query; identify an initial set of linked records; run the query on the initial set of linked records; iteratively amend the initial set to a final set of linked records, wherein a result obtained by executing the query on the final set matches the expected result; and extract the final set into a new database.

In some embodiments, when tracking the records associated with the query, the processor executes the processor-executable program code in order to cause the computing system to: create a listener object; register the listener object with a record fetcher; record a record handle of each tracked record by the listener object; and store the record handles in a collection.

In some embodiments, when amending the initial set to the final set, the processor executes the processor-executable program code in order to cause the computing system to: run the query on the initial set; determine if the result obtained by running the query on the initial set matches the expected result; if the result does not match the expected result, a) set the initial set as a current set; b) expand the current set to an expanded set and save the expanded set; c) if a further result obtained by running the query on the expanded set does not match the expected result, then repeat step (b); and d) if the further result obtained by running the query on the expanded set matches the expected result, save the expanded set as the final set; and if the result obtained by running the query on the initial set matches the expected result, e) set the initial set as the current set; f) reduce the current set to a reduced set and save the reduced set; g) if a further result obtained by running the query on the reduced set matches the expected result, then repeat step (f); and h) if the further result obtained by running the query on the reduced set does not match the expected result, save the reduced set as the final set.

In some embodiments, when extracting the final set into the new database, the processor executes the processor-executable program code in order to cause the computing system to: create the new database; clone a plurality of temporary tables and relationships between the temporary tables into the new database, the final set comprising the plurality of temporary tables and relationships between the temporary tables stored on the database; and delete the temporary tables from the database. In some embodiments, the database is a relational database.

In another aspect, there is provided a non-transitory computer-readable medium storing program code, the program code executable by a processor of a computing system to cause the computing system to: receive a query and an expected result of the query obtained after executing the query on a database; in response to the query, track records associated with the query; identify an initial set of linked records; run the query on the initial set of linked records; iteratively amend the initial set to a final set of linked records, wherein a result obtained by executing the query on the final set matches the expected result; and extract the final set into a new database.

In some embodiments, when tracking the records associated with the query, the program code executable by the processor causes the computing system to: create a listener object; register the listener object with a record fetcher; record a record handle of each tracked record by the listener object; and store the record handles in a collection.

In some embodiments, when amending the initial set to the final set, the program code executable by the processor causes the computing system to: run the query on the initial set; determine if the result obtained by running the query on the initial set matches the expected result; if the result obtained by running the query on the initial set does not match the expected result, a) set the initial set as a current set; b) expand the current set to an expanded set and save the expanded set; c) if a further result obtained by running the query on the expanded set does not match the expected result, then repeat step (b); and d) if the further result obtained by running the query on the expanded set matches the expected result, save the expanded set as the final set; and if the result obtained by running the query on the initial set matches the expected result, e) set the initial set as the current set; f) reduce the current set to a reduced set and save the reduced set; g) if a further result obtained by running the query on the reduced set matches the expected result, then repeat step (f); and h) if the further result obtained by running the query on the reduced does not match the expected result, save the reduced set as the final set.

In some embodiments, when extracting the final set into the new database, the program code executable by the processor causes the computing system to: create the new database; clone a plurality of temporary tables and relationships between the temporary tables into the new database, the final set comprising the plurality of temporary tables and relationships between the temporary tables stored on the database; and delete the temporary tables from the database.

In some embodiments, a returned result of a query on a database is incorrect. Since the database is large and complex, isolating the source of the error in the database is time-consuming. Instead, the query-based isolator can create a database subset that includes only those records, and their relationships, that are accessed when the query is performed. The diagnostics can then be performed on the database subset, rather than the entire database, thereby saving time and resources.

In some embodiments, a query is repeatedly performed on a portion of the database—i.e. not all of the records in the database are needed for the query. Since the database is large and complex, running the query on the database is time-consuming. Instead, the query-based isolator can create a database subset that includes only those records, and their relationships, that are accessed when the query is performed. The query can then be performed on the database subset, rather than the entire database, thereby saving time and resources.

The database subset used for the query can be stand-alone. In some embodiments, it can be stored on a separate device or, in other embodiments, on the same device as the database. In some embodiments, the database is a relational database.

In some embodiments, the query is a frequently-used query that does not change over time. In some embodiments, the query is focused on a portion of data (for example, if data has time-stamp query that looks at data over a certain period of time). In some embodiments, a Master Query can be formed that includes all the fields and tables that a user wants to include in the database subset.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In an embodiment, the system comprises an observer, a collator and an extractor.

Figure 1:
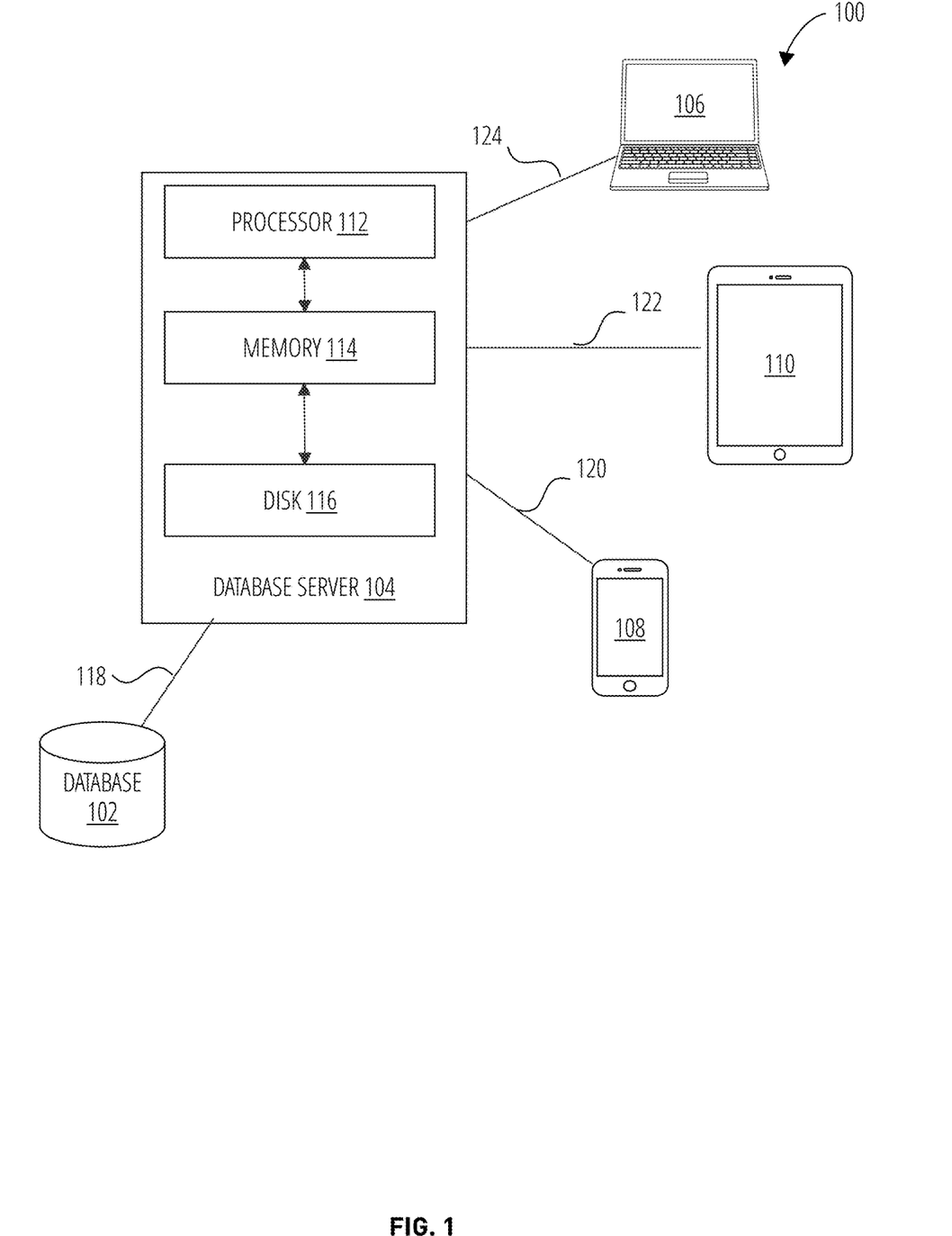
FIG. 1 illustrates an example of a system for storing and querying databases, according to some embodiments.

FIG. 1 illustrates an example of a 100 for storing and querying databases, according to some embodiments.

FIG. 1 illustrates a non-limiting example of a 100 for storing and querying databases, in accordance with certain embodiments of the present disclosure. 100 includes a database server 104, a database 102, and client devices 106, 108 and 110. Database server 104 can include a memory 114, a disk 116, and a processor 112. While one processor 112 is shown, the database server 104 can comprise one or more processors. In some embodiments, memory 114 can be volatile memory, compared with disk 116 which can be non-volatile memory. In some embodiments, database server 104 can communicate with database 102 using interface 118. Database can be a versioned database or a database that does not support versioning. While database 102 is illustrated as separate from database server 104, database 102 can also be integrated into database server 104, either as a separate component within database server 104, or as part of at least one of memory 114 and disk 116. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 114 and disk 116. Storage media can include volatile and nonvolatile, removable and non-removable media implemented in any method or technology for storage of information such as computer-readable instructions, data structures, program modules or other data. Memory 114 and disk 116 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100. System 100 can also include interfaces 118, 120, 122 and 124. Interfaces 118, 120, 122 and 124 can allow components of system 100 to communicate with each other and with other devices. For example, database server 104 can communicate with database 102 using interface 118. Database server 104 can also communicate with client devices 106, 108 and 110 via interfaces 124, 120 and 122, respectively. Client devices 106, 108 and 110 can be different types of client devices; for example, client device 106 can be a desktop or laptop, whereas client device 120 can be a mobile device such as a smartphone; client device 110 can be a tablet with a larger display. Non-limiting example interfaces 118, 120, 122 and 124 can include wired communication links such as a wired network or direct-wired connection, and wireless communication links such as cellular, radio frequency (RF), infrared and/or other wireless communication links. Interfaces 118, 120, 122 and 124 can allow database 102 to communicate with client devices 106, 108 and 110 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 110a-b and 112 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Database 102 may comprise a relational database, a multi-dimensional database, an eXtendable Markup Language (XML) document, or any other data storage system storing structured and/or unstructured data. Database 102 may comprise any query-responsive data source or sources that are or become known, including but not limited to a structured-query language (SQL) relational database management system. Data in database 102 may be distributed among several relational databases, multi-dimensional databases, and/or other data sources. Embodiments are not limited to any number or types of data sources. For example, database 102 may comprise one or more OnLine Analytical Processing (OLAP) databases (i.e., cubes), spreadsheets, text documents, presentations, etc.

Database 102 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Data includes hierarchical data and, typically, non-hierarchical data. In some embodiments, data can comprise one or more of conventional tabular data, row-based data stored in row format, column-based data stored in columnar format, and object-based data.

Database 102 may store metadata regarding the structure, relationships and meaning of data. This information may include data defining the schema of database tables stored within the data. A database table schema may specify the name of the database table, columns of the database table, the data type associated with each column, and other information associated with the database table. Database 102 may also or alternatively support multi-tenancy by providing multiple logical database systems which are programmatically isolated from one another. Moreover, the data may be indexed and/or selectively replicated in an index to allow fast searching and retrieval thereof.

Using interface 118, database server 104 can retrieve data from database 102. The retrieved data can be saved in disk 116 or memory 114. In some cases, database server 104 can also comprise a web server, and can format resources into a format suitable to be displayed on a web browser. Database server 104 can then send requested data to client devices 106, 108 and 110 via interfaces 120, 122 and 124 to be displayed on an application on each device; the application can be a web browser or other application running on client devices 106, 108 and 110.

Figure 2:
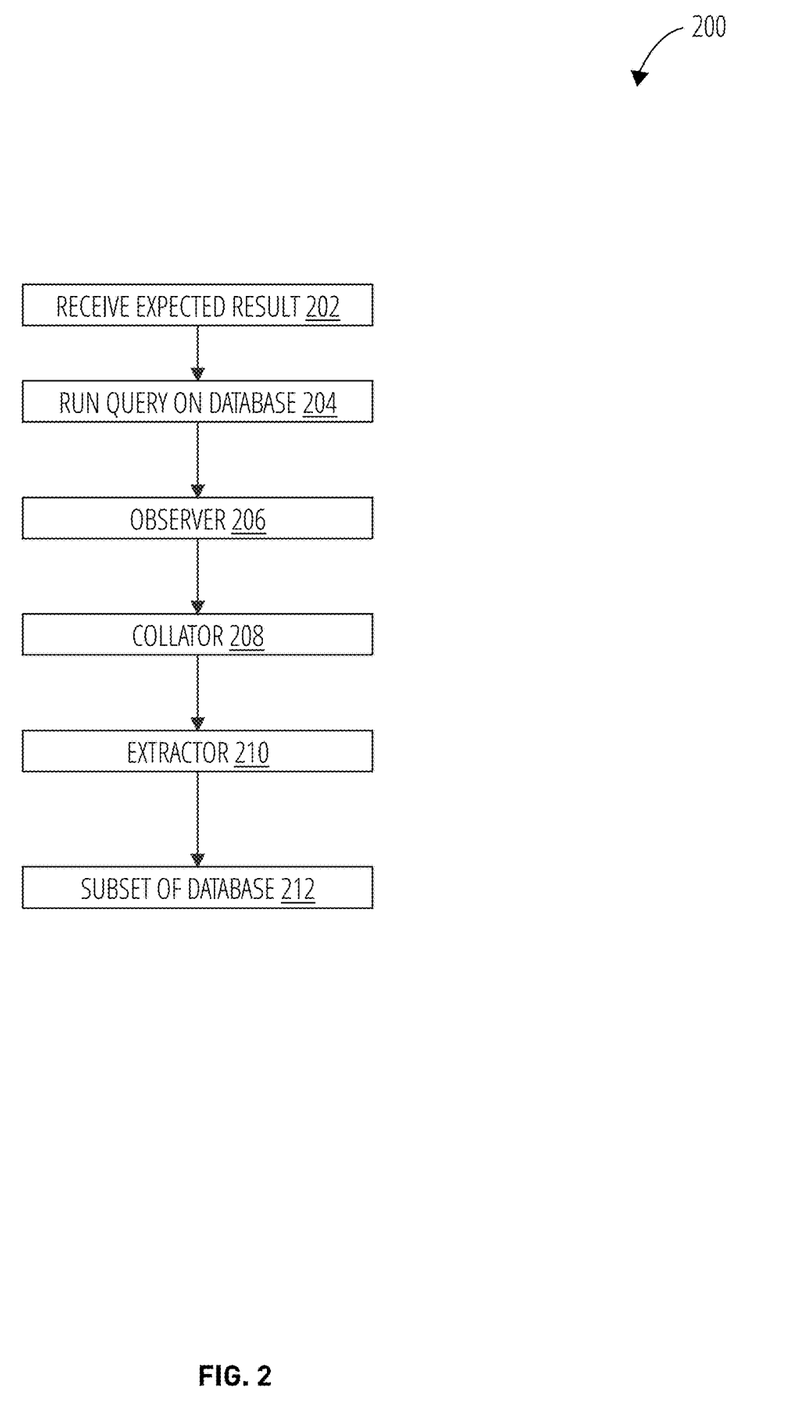
FIG. 2 illustrates a flowchart of a query-based isolator in accordance with one embodiment.

FIG. 2 illustrates a flowchart 200 of a query-based isolator in accordance with one embodiment.

The result of executing a query on a database (i.e. the "expected result") are received at block 302. The expected result will be used to compare with query search results after iteratively performing the same query on a portion of the database by a collator. The query is run on the database at block 204. During this run, an observer observes the records (in the database) that are being touched while the query is being performed, at block 206. A collator forms a set of these records, along with linked records that are linked to these query records, at block 208. The collator performs either an iterative expansion or reduction of the linked records, until it provides a subset of the database that reproduces the query results that match the expected result. The iterative procedure is described further below. An extractor extracts all of the linked records of the final subset produced by the collator, along with their relationships, at block 210, to make a database subset at block 212. The resulting database subset, rather than the original database, can then be used to perform the original query.

Subroutines for each of the observer, collator and extractor are described below.

Observer

Figure 3:
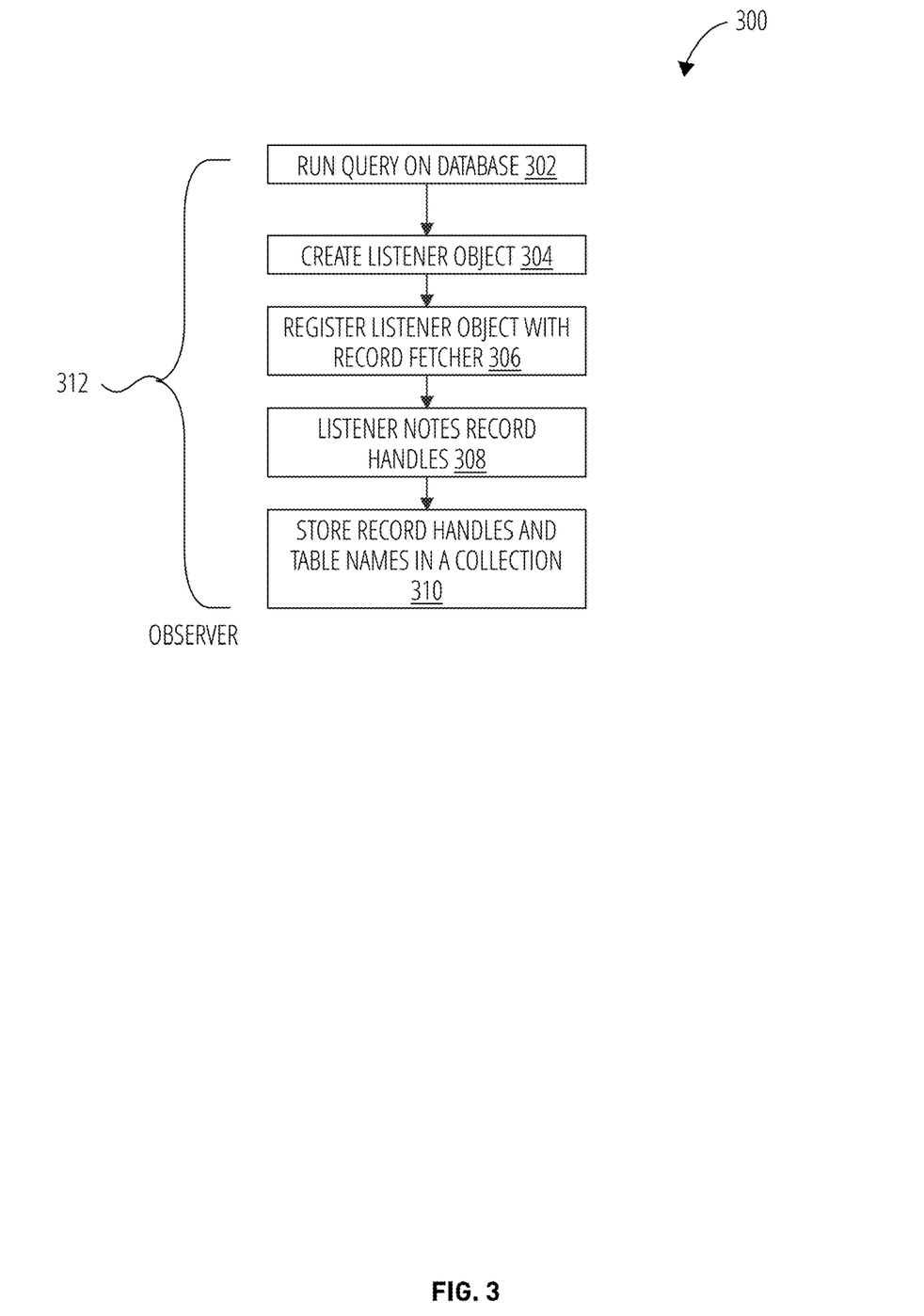
FIG. 3 illustrates an observer flowchart in accordance with one embodiment of a query-based isolator.

FIG. 3 illustrates an observer flowchart 300 in accordance with one embodiment of a query-based isolator.

A database query engine accesses several records from many related tables, when executing a query on a database. Each access to a record can be logged by implemented listener objects. The implementation details of such listeners are specified to databases. When a specific query is executed, the observer logs the record handles noted by the listeners. An example of operation of the observer 312 is described below.

A query is run on the database at block 302. A listener object can then be attached to note any of the records being accessed during the query. This can be achieved by creating a listener object (at block 304) and registering it with a record fetcher (at block 306). When records are accessed during computation of results for the given query, the listener notes the respective record handles at block 308. These record handles are stored along with their respective table names in a collection at block 310. As a result, the output is a collection of the record handles of all accessed records.

Collator

Figure 4:
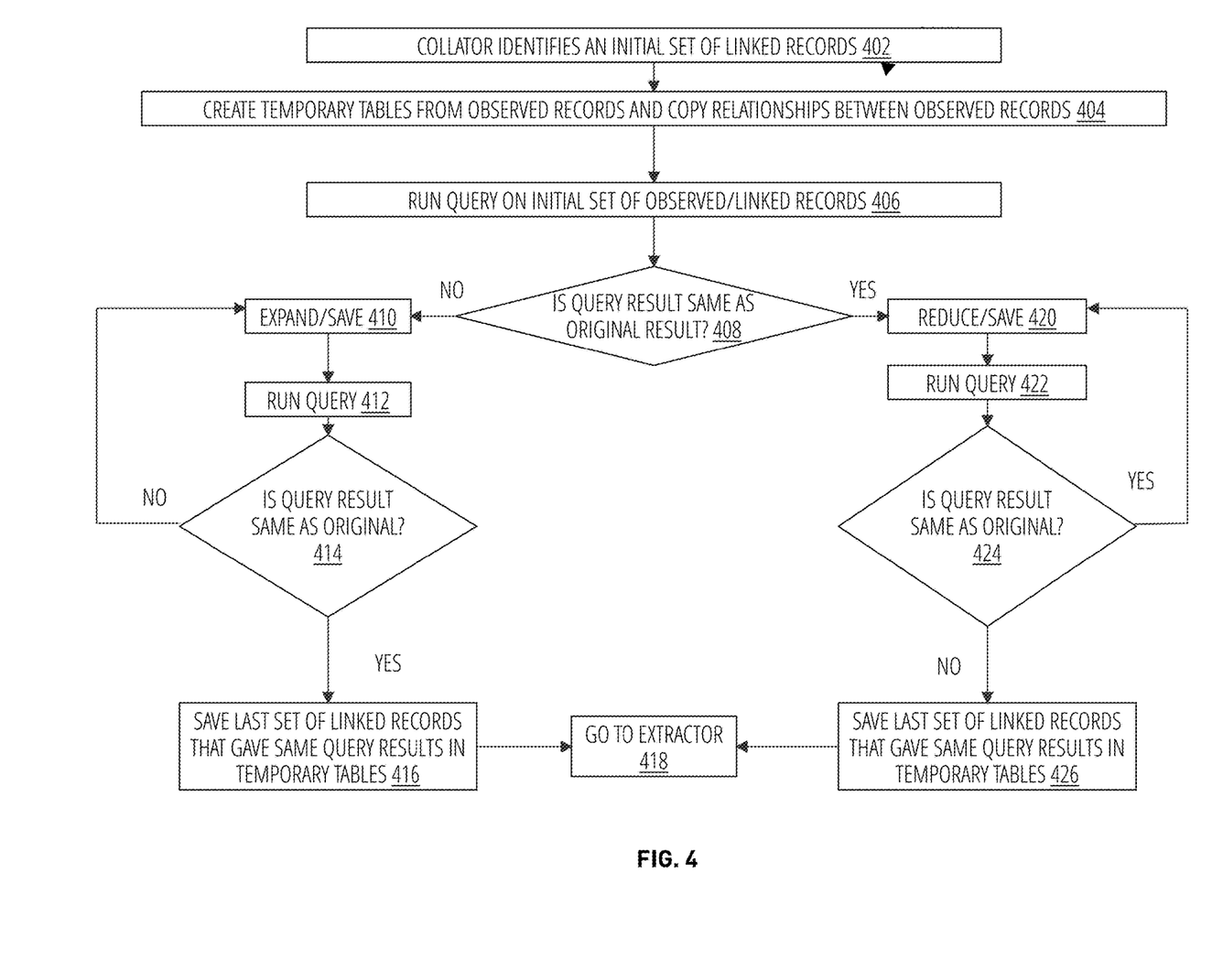
FIG. 4 illustrates a collator flowchart in accordance with one embodiment of a query-based isolator.

FIG. 4 illustrates a collator flowchart in accordance with one embodiment of a query-based isolator.

A collator obtains a collection of record handles of records that have been accessed by the query, from the observer. It then identifies a series of links associated with the accessed records, and starts with an initial intermediate subset on which to run the query. After running the query, the collator can either expand or reduce the intermediate subset, until it obtains a subset which produces the same query result as the original query result. This subset is then sent to the extractor. Various steps of the flowchart of a collator are described as follows.

At block 402, the collator identifies an initial set of linked records. For example, the observer provides a collection of records handles; the collator may identify an initial set of linked records that includes only primary links. In some embodiments, the collator may include all of the linked records for the initial set. In some embodiments, the collator may identify an initial set of linked records to include links somewhere between primary links and all links. This identification of an initial set of links may be set by the user.

Once the collator identifies an initial set of linked records at block 402, the collator creates temporary tables from the observed records and copies relationships between the observed records, to create an initial intermediate set of observed/linked records at block 404. The collator then runs a query on the initial intermediate set of observed/linked records at block 406. The result of the query is compared to the original query result (obtained after running the query on the full database) at decision block 408.

If the answer is 'yes' at decision block 408, this means that the initial intermediate set may be pared down in size at block 420. The reduced set is also temporarily saved at block 420. The query is now run on the reduced intermediate set at block 422. If the query result is still the same as the original query result, then the reduced intermediate set can be reduced again. The reduction is reiterated until the resulting query is not the same as the original query result, at which point, the last set of linked records (that gave the same results as the original query) are saved in temporary tables (at block 426) passed onto the extractor at block 418.

If the answer is 'no' at decision block 408, this means that the initial intermediate set may be expanded in size at block 410, to include additionally linked records. The expanded set is also temporarily saved at block 420. The query is now run on the expanded intermediate set at block 412. If the query result is still not the same as the original query result, then the expanded intermediate set can be expanded again. The expansion is reiterated until the resulting query is the same as the original query result, at which point, the last set of linked records (that gave the same results as the original query) are saved in temporary tables (at block 416) are passed onto the extractor at block 418.

Extractor

Figure 5:
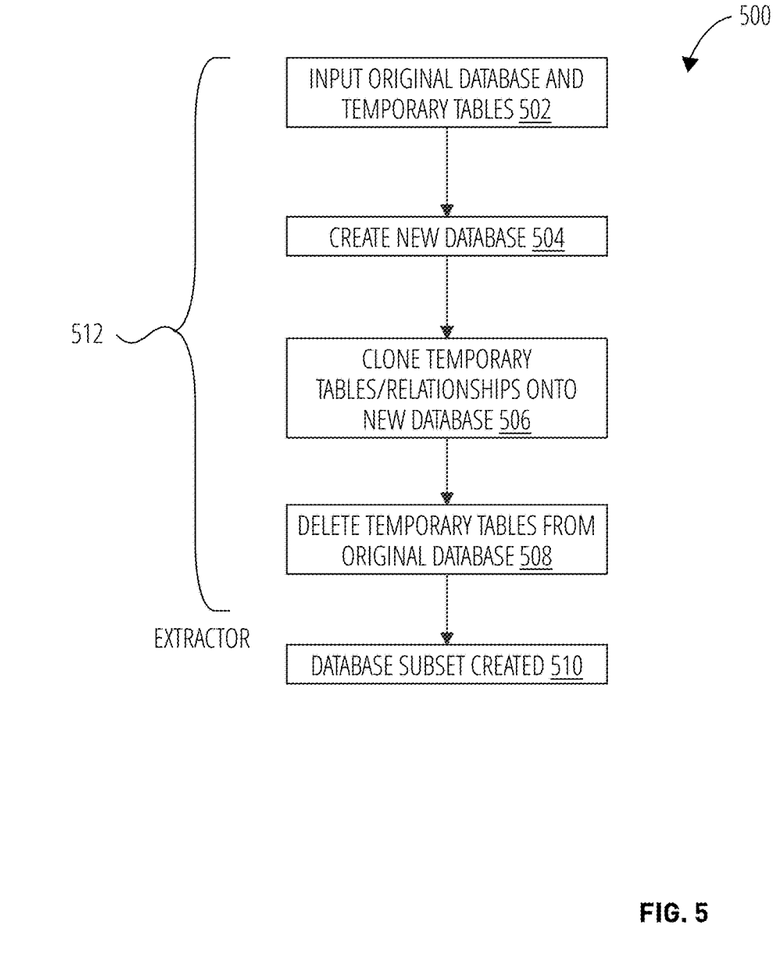
FIG. 5 illustrates an extractor flowchart in accordance with one embodiment of a query-based isolator.

FIG. 5 illustrates an extractor flowchart 500 in accordance with one embodiment of a query-based isolator.

An extractor moves the linked temporary tables into a new database subset. Extractor flowchart 500 describes operation of an extractor 512 in accordance with one embodiment of a query-based isolator. Extractor flowchart 500 includes the original database with new temporary tables and their relationships (as output in block 508 (deleted) of the collator, shown in FIG. 5 (deleted)), as input at block 502. A new database with the same schema as the original is created at block 504. Temporary tables are cloned into the new database, along with their relationships at block 506. The temporary tables are then deleted from the original database at block 508. As a result, the output includes a database subset at block 510, along with the restored original database. The query can now be performed on the database subset, rather than the original database.

Figure 6:
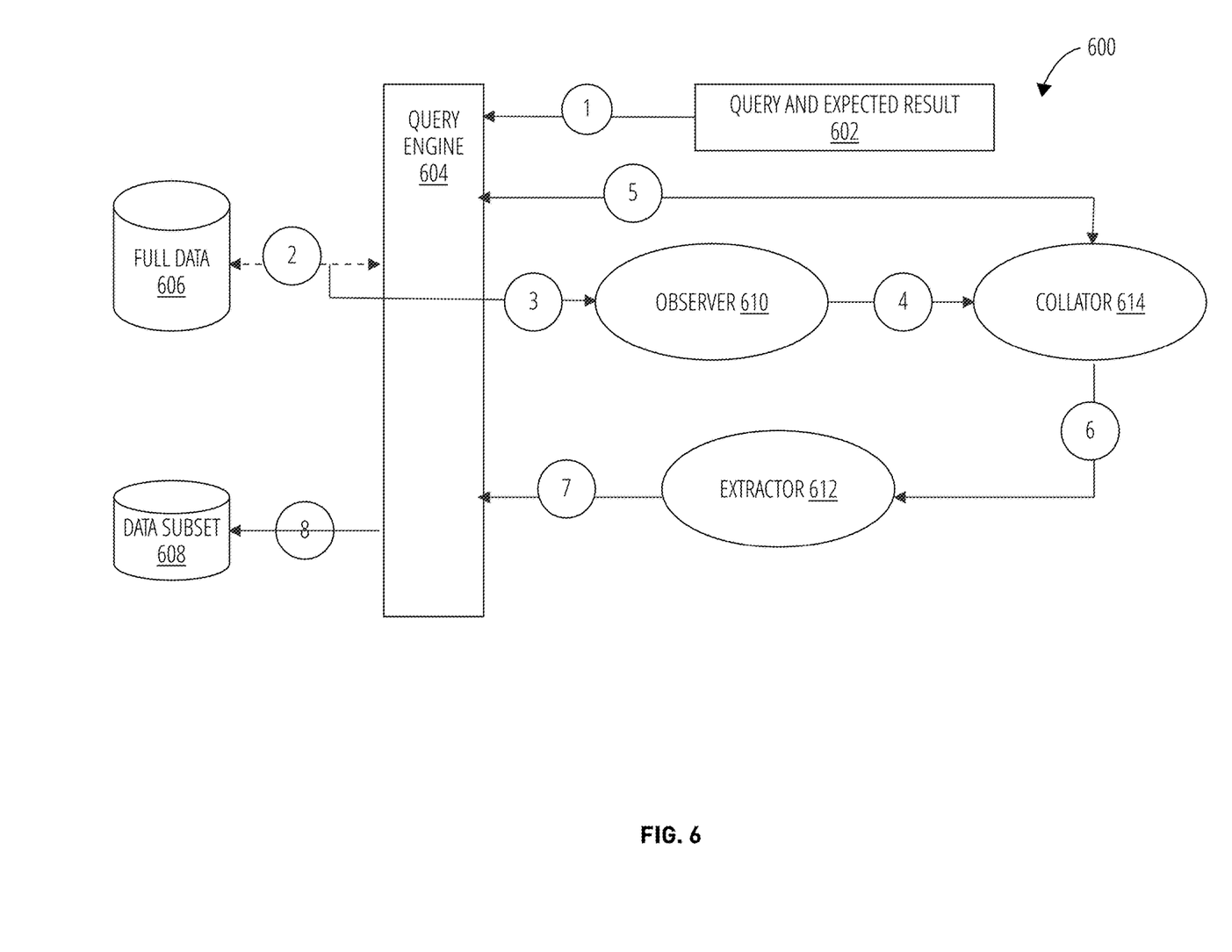
FIG. 6 illustrates a system architecture of a query-based isolator in accordance with one embodiment.

FIG. 6 illustrates a system architecture 600 of a query-based isolator in accordance with one embodiment of a query-based isolator.

In some embodiments, a returned result of a query on a database is incorrect. Rather than running diagnostics on the full database (which is time-consuming), a query-based isolator can use the initial query results (or "expected" results) to create a database subset that includes only those records, and their relationships, that are accessed when the query is performed. The diagnostics can then be performed on the database subset, rather than the entire database, thereby saving time and resources.

In some embodiments, a query is repeatedly performed on a portion of the database—i.e. not all of the records in the database are needed for the query. Rather than running the query and expected result 602 on the full database (which is time-consuming), a query-based isolator can use the initial query results (or "expected" results) to create a database subset that includes only those records, and their relationships, that are accessed when the query is performed. The query can then be performed on the database subset, rather than the entire database, thereby saving time and resources.

In system architecture 600, a query and expected result 602 are used as input to a query engine 604 at step 1. The query engine 604 runs the query on the full data 606 at step 2. An observer 610 identifies the records that are involved in the query (i.e. being touched or accessed by the query engine 604 at step 3. An embodiment of the observer is shown in FIG. 3. A collator 614 iteratively samples the records that were tracked by the observer 610 at step 5, in order to shrink or expand (if necessary) the optimal record list to the point that the same input query generates the same expected result that was input initially. Once the optimal record list is identified, it is extracted by an extractor 612 at step 6, which then sends a reduced data set to the query engine 604, at step 7, for storage and analysis at step 8. The resulting data subset 608 is stored for use by the query. The database subset is stand-alone, and can be stored in the same, or separate devices as the database.

In some embodiments, the resulting subset can be used for diagnostic purposes. In some embodiments, the resulting subset can be used to run a query repeatedly.

Figure 7:
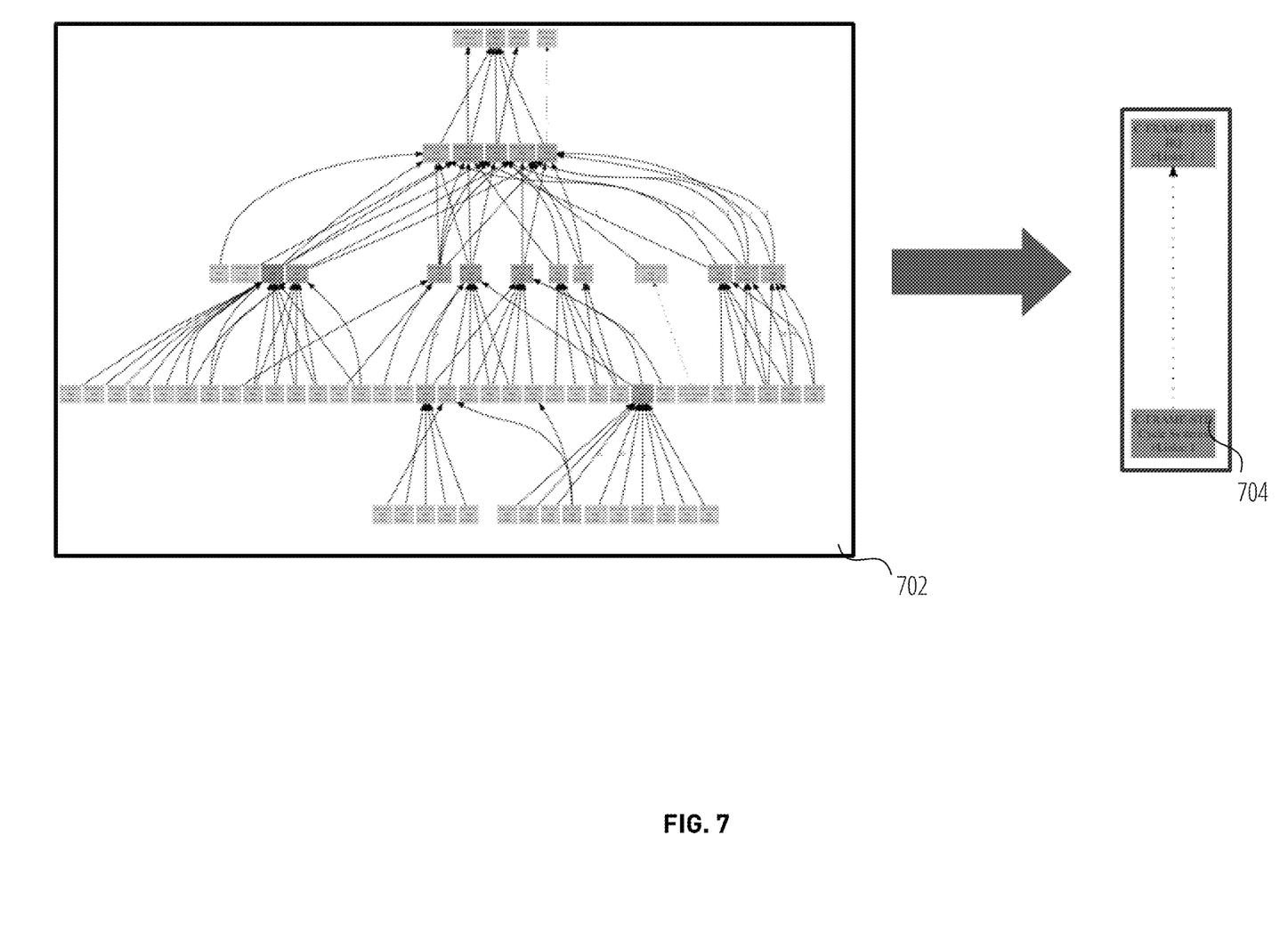
FIG. 7 illustrates query-based isolator in accordance with one embodiment.

FIG. 7 illustrates a query-based isolator in accordance with one embodiment. In this embodiment, a query-based isolator is applied for the purpose of diagnostics, in which the size and complexity of a database 702 is reduced to a database subset 704 on which the query can be performed in order to find the source of an error.

In this diagnostic example, the returned result of a query is incorrect. However, due to the size of database 702 and complexity of the relations between records, diagnostics (debugging) of the entire database 702 is both expensive and time-consuming.

In an embodiment of a query-based isolator, the query and the incorrect result are used as input. The method then iteratively identifies a minimum subset of records that is needed to reproduce the same incorrect result. Each step is described in further detail below, with reference to FIG. 6, FIG. 8, FIG. 9 and FIG. 10.

Figure 8:
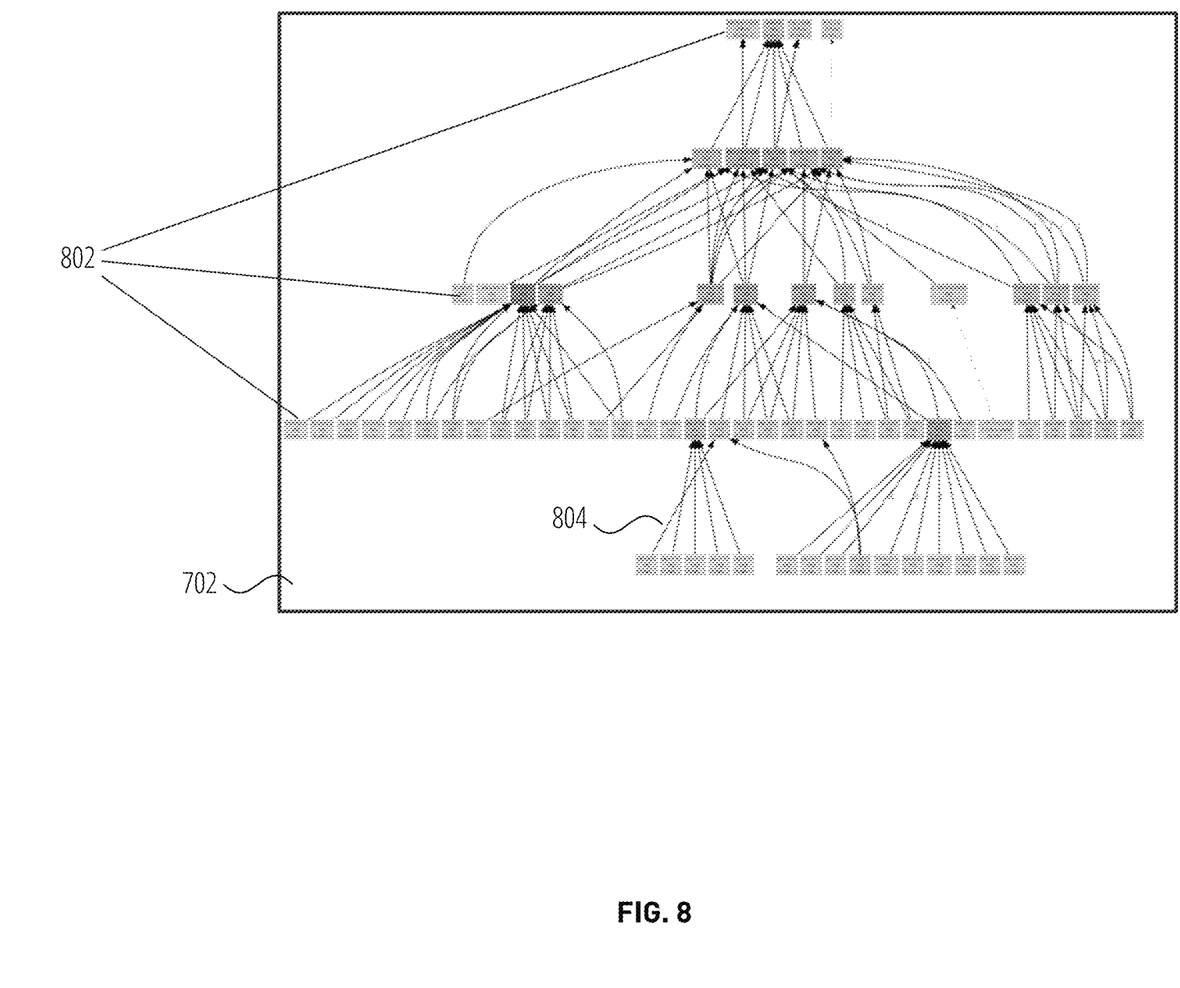
FIG. 8 illustrates operation of an observer in the embodiment shown in FIG. 7.

FIG. 8 illustrates operation of an observer in the embodiment shown in FIG. 7. Individual blocks 802 are representative of records and connecting lines/arrows 804 between the blocks 802 are representative of different relation types between the records.

As described above, a user enters the query and the current (incorrect) result. The query is run on the database 702 by the query engine. The observer identifies the records that are involved in the query (i.e. accessed by the query engine). The next step involves collation of the observed results.

Figure 9:
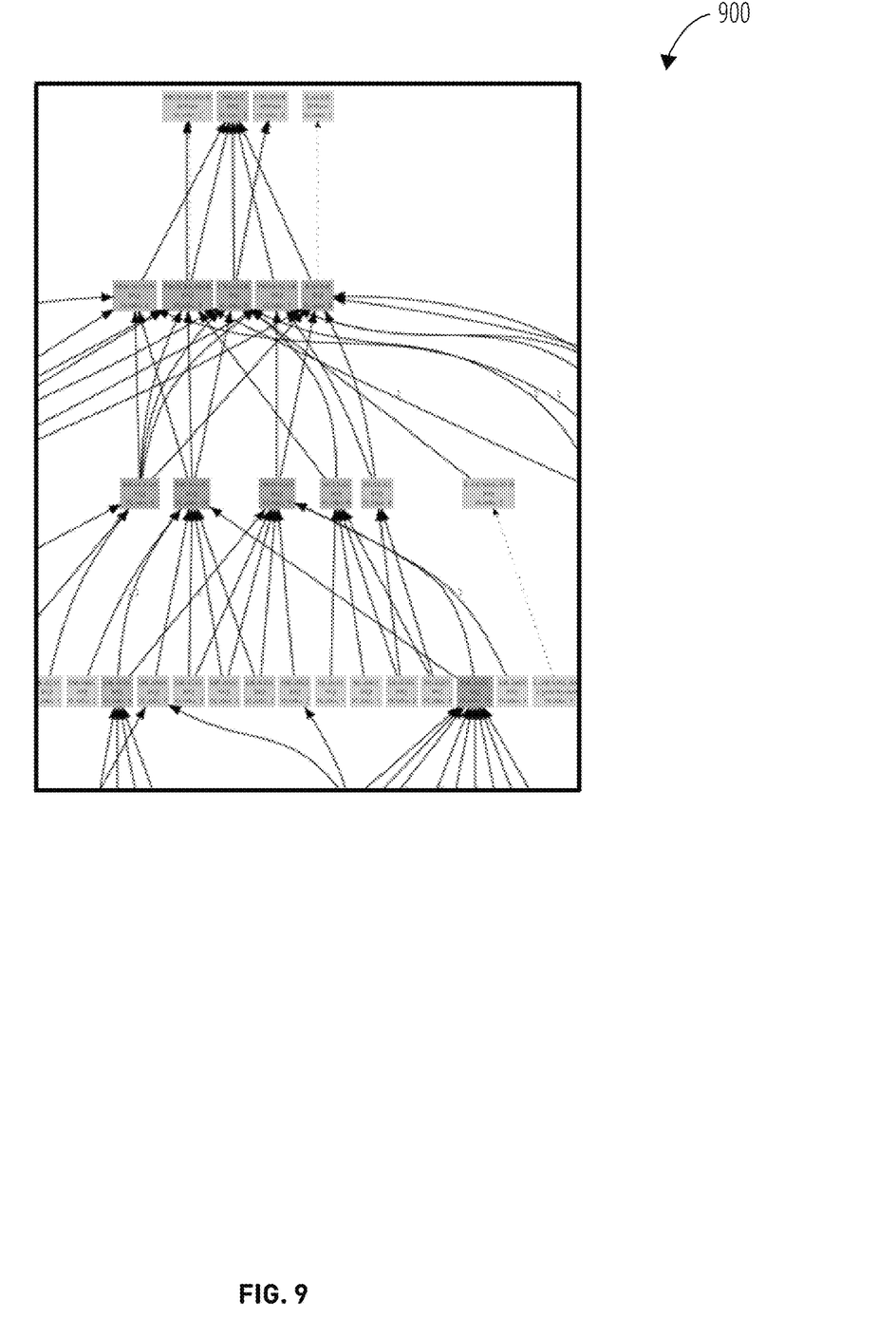
FIG. 9 illustrates operation of a collator in the embodiment shown in FIG. 7.

FIG. 9 illustrates operation of a collator in the embodiment shown in FIG. 7. The collator iteratively samples the records that were tracked by the observer, in order to shrink or expand (if necessary) the record list to the point that same input query generates the same expected result. FIG. 9 provides a snapshot of the iterative procedure.

Figure 10:
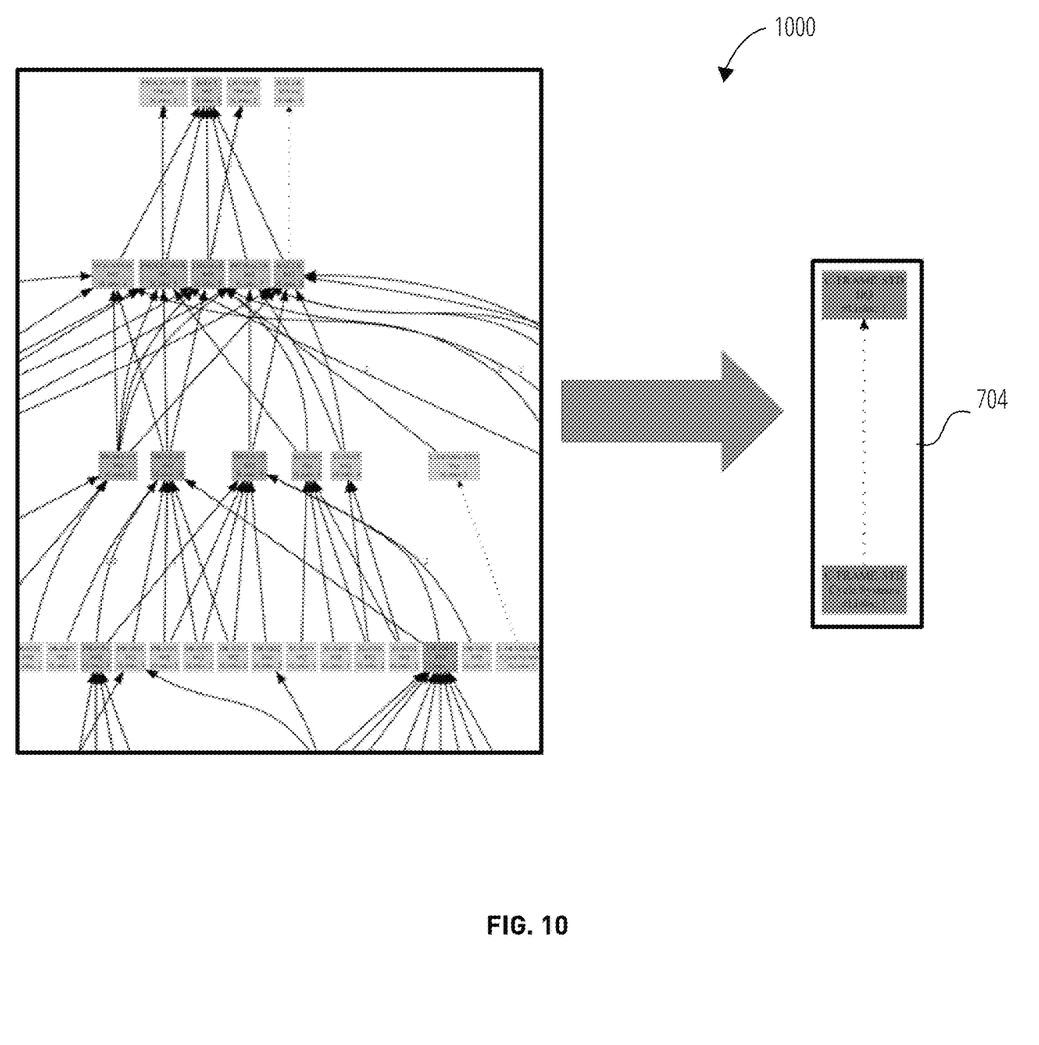
FIG. 10 illustrates operation of an extractor in the embodiment shown in FIG. 7.

FIG. 10 illustrates operation of an extractor in the embodiment shown in FIG. 7. Following collation, a minimal record list is sent to an extractor that forms a new database subset 804 that can reproduce the same issue but has far fewer records and is therefore less expensive to analyze. The diagnostics can be performed on the reduced database subset 804, rather than the large, complex database 702.

Figure 11:
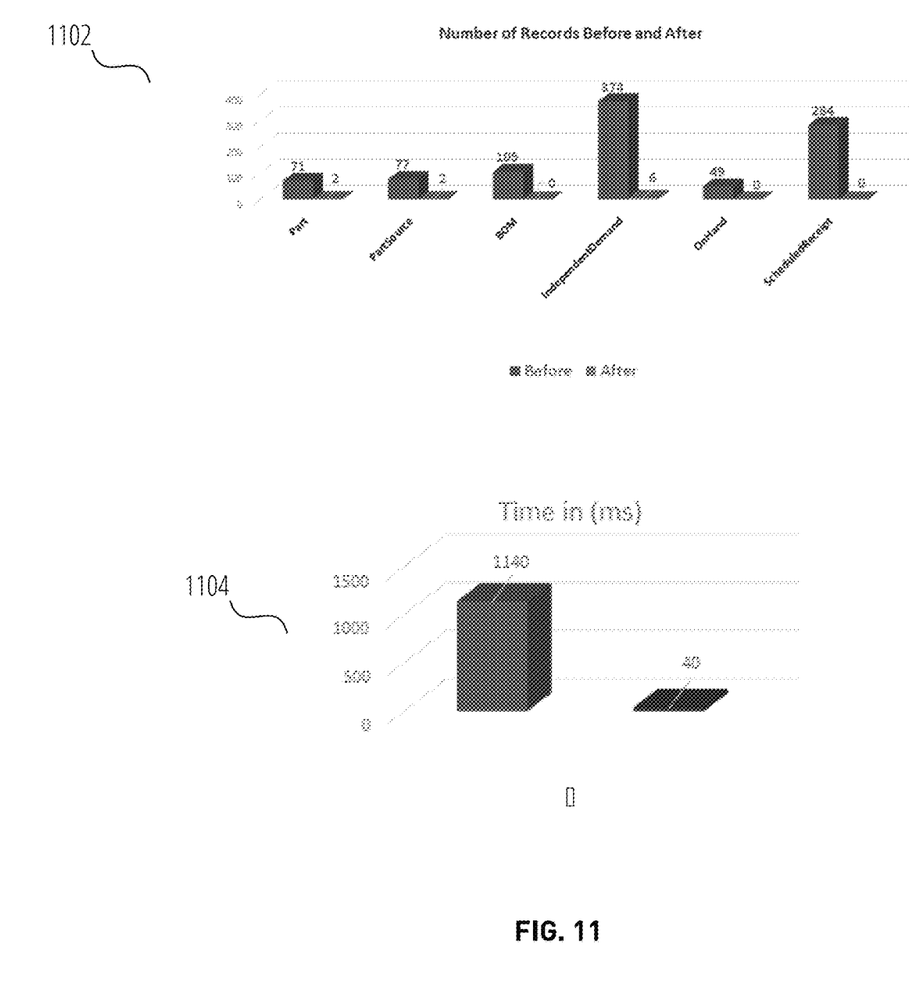
FIG. 11 illustrates comparative results in accordance with one embodiment of a query-based isolator.

FIG. 11 illustrates comparative results in accordance with one embodiment. Chart 1102 shows the reduction in the number of records used to run a query before and after application of a query-based isolator. Rather than access 960 records in an original database, the method reduces the dataset to 10 records for diagnostics. This is a 99% reduction in the number of records needed to perform diagnostics for a query.

Chart 1104 illustrates the time required to perform the diagnostics, before and after applying the query-based isolator. Without use of the query-based isolator, it takes 1140 ms; with the query-based isolator, only 40 ms are required, resulting in a 96% reduction in time required to perform the diagnostics.

EXAMPLE: FLIGHT BOOKINGS

Figure 12:
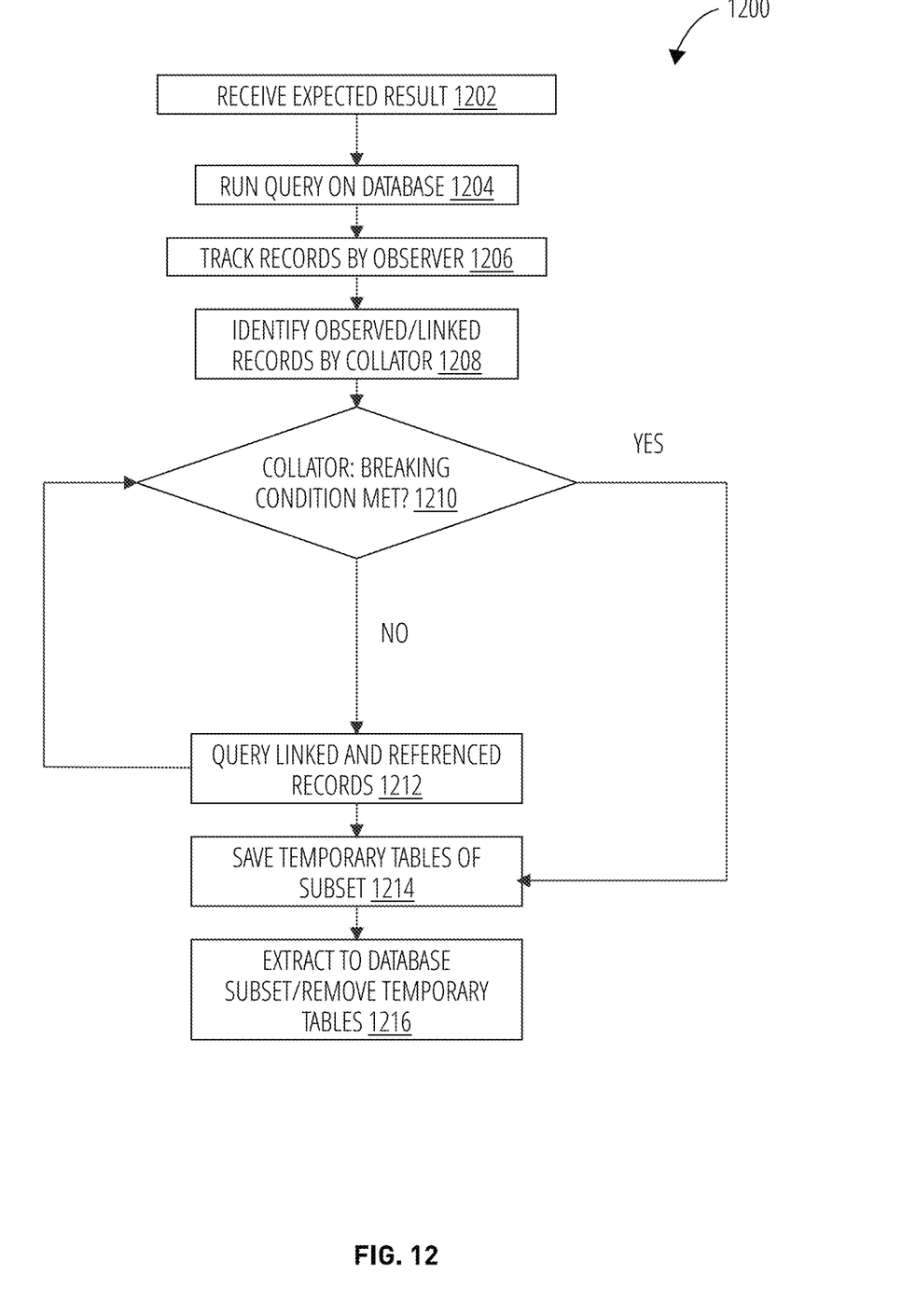
FIG. 12 illustrates a flowchart in accordance with one embodiment of a query-based isolator.

FIG. 12 illustrates a flowchart 1200 in accordance with one embodiment where a query-based isolator is used to extract a subset of the database on which a query is repeatedly performed.

In an embodiment, a query-based isolator can be used to define a subset of a database for recurring queries.

In a flight reservation system, the database holds information about flights, airports, customers, airlines, passengers, operators, baggage, etc., throughout the world. This database is both complex and quite large for worldwide systems. In addition, the database in dynamic in that the worldwide database is being updated with new data that is coming in constantly.

In some embodiments, only a subset of the database may be needed on which to perform certain queries. As an example, an agent may be responsible for customers for only a few locations over a certain time period (e.g. customers who have traveled within the past three to six months, to and from North America). The agent does not need to connect to the worldwide database for each access. Instead, the agent can create a subset of the worldwide database with the requisite data and maintain a local copy of the database subset, which is used to run the query.

As an example of a query, the agent can ask for all customer information for the past three months for Ottawa, Boston and Chicago.

As input, the agent can query full customer information for the time period for certain locations in North America at block 1204. The original query result (i.e. the "expected" result) is received and saved at block 1202; the expected result is used to evaluate the breaking condition at decision block 1210.

The query is run again on the database at block 1204, and this time, the touched records are tracked by an observer at block 1206. The records, within the worldwide database, that are tracked within the query period (the past 3 months) can include flight records that fly to, or out Ottawa, Boston and Chicago, along with passenger information of passengers who took flights associated with those locations. The observer collects the record handles of the touched records, and provides them to a collator.

A collator then identifies the observed/linked records at block 1208, to provide an intermediate subset. The query is iteratively run on an intermediate subset, thereby either expanding or reducing the subset, until a breaking condition is met at decision block 1210.

An example of the breaking condition (decision block 1210) can be described as follows. The tracked records at block 1206 may contain flight information originating from one of the designated North American locations to an airport outside of North America. These records are then excluded in an iterative manner, in that the query-based isolator can go through each record one by one. The query is then run on a new, reduce set of linked and referenced records at block 1212. If the results form the query (run on this subset) matches the result of the same query on the original data set, then the new reduced dataset is saved. Otherwise, further removal of one or more records takes place. If there are no record left to exclude, the collator is exited. The final results from the query run on the subset of the full database must match with the record set from the same query run on the main database. This is the breaking condition check.

The final subset of the database, formed at block 1216, may contain the following records: airports that in the designated North American locations; flights at these locations; and passengers who took the specific flights. Relationships, such as cross references between tables, are also preserved in this database subset.

A few advantages of this approach include use of a smaller size of the worldwide database, so that a local copy of the subset can be maintained. This will also avoid further remote server queries. Furthermore, the query execution time is faster since there are fewer records to filter in the database subset.

The implementations described herein can be implemented for both in-memory storage and disk-based storage. The systems and methods can be implemented in a processor using hardware and/or software processing, with a processor that can include one or more general purpose CPUs, and/or special purpose processing. The processor can include execution circuitry and memory for storing data and instructions. The system can be used to save data in in-system memory, or on other data storage media including magnetic or optical media. The memory can reside in one location or in multiple locations. Interfaces can also be provided between the processor and memory. Instructions to be executed by processing circuitry can be stored in various types of memory in a non-transitory manner.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computing system comprising:
a storage device storing an original database, the original database having a structure and schema;
a memory storing processor-executable program code;
a query engine; and
a processor to execute the processor-executable program code in order to cause the computing system to:
execute a query on the original database, thereby obtaining a query result;
track:
all query records that are touched while the query is executed; and
one or more records that are linked to the query records; and
produce a stand-alone subset database consisting of the query records and the one or more records that are linked to the query records;
wherein:
the stand-alone subset database has a schema that is identical to the schema of the original database: and
the stand-alone subset database has fewer records than the original database.

2. A non-transitory computer-readable medium storing program code, the program code executable by a processor of a computing system to cause the computing system to:
execute a query on an original database, thereby obtaining a query result;
track:
all query records that are touched while the query is executed; and
one or more records that are linked to the query records; and
produce a stand-alone subset database consisting of the query records and the one or more records that are linked to the query records;
wherein:
the stand-alone subset database has a schema that is identical to a schema of the original database; and
the stand-alone subset database has fewer records than the original database.

3. The computing system of claim 1, wherein when tracking the query records and the one or more records that are linked to the query records, the processor executes the processor-executable program code in order to cause the computing system to:
create a listener object;
register the listener object with a record fetcher;
record a record handle of each tracked record by the listener object; and
store the record handles in a collection.

4. The computing system of claim 1, wherein the original database is a relational database.

5. The computing system of claim 1, wherein the stand-alone subset database is produced by removing all records that are untracked.

6. The computing system of claim 1, wherein the stand-alone subset database is produced by extracting the query records and the one or more records that are linked to the query records into a new database.

7. The non-transitory computer-readable medium storing program code of claim 2, wherein when tracking the query records and the one or more records that are linked to the query records, the program code executable by the processor causes the computing system to:
create a listener object;
register the listener object with a record fetcher;
record a record handle of each tracked record by the listener object; and
store the record handles in a collection.

8. The non-transitory computer-readable medium storing program code of claim 2, wherein the original database is a relational database.

9. The non-transitory computer-readable medium storing program code of claim 2, wherein the stand-alone subset database is produced by removing all records that are untracked.

10. The non-transitory computer-readable medium storing program code of claim 2, wherein the stand-alone subset database is produced by extracting the query records and the one or more records that are linked to the query records into a new database.

* * * * *